US011306761B2

(12) United States Patent
Yen (10) Patent No.: US 11,306,761 B2
(45) Date of Patent: Apr. 19, 2022

(54) SELF-TAPPING SCREW

(71) Applicant: TYCOONS GROUP ENTERPRISE CO., LTD., Kaohsiung (TW)

(72) Inventor: Pang-Hsiu Yen, Kaohsiung (TW)

(73) Assignee: TYCOONS GROUP ENTERPRISE CO., LTD., Kaohsiung (TW)

( * ) Notice: Subject to any disclaimer, the term of this patent is extended or adjusted under 35 U.S.C. 154(b) by 362 days.

(21) Appl. No.: 16/710,439

(22) Filed: Dec. 11, 2019

(65) Prior Publication Data

US 2021/0180635 A1 Jun. 17, 2021

(51) Int. Cl.
*F16B 25/10* (2006.01)

(52) U.S. Cl.
CPC ............ *F16B 25/103* (2013.01); *F16B 25/10* (2013.01)

(58) Field of Classification Search
CPC .. F16B 25/00; F16B 25/0047; F16B 25/0052; F16B 25/0078; F16B 25/10; F16B 25/103; F16B 35/041
USPC ......... 411/387.1, 387.4, 387.5, 387.7, 387.8, 411/411, 418, 424, 426
See application file for complete search history.

(56) References Cited

U.S. PATENT DOCUMENTS

| 2,232,336 | A | * | 2/1941 | Meersteiner | F16B 25/0021 |
| | | | | | 411/421 |
| 2,263,137 | A | | 11/1941 | Oestereicher | |
| 7,393,170 | B2 | * | 7/2008 | Chen | F16B 25/0052 |
| | | | | | 411/387.1 |
| 2003/0198532 | A1 | * | 10/2003 | Hsu | F16B 25/0068 |
| | | | | | 411/311 |
| 2007/0166124 | A1 | * | 7/2007 | Hsu | F16B 25/0073 |
| | | | | | 411/387.1 |
| 2009/0274535 | A1 | * | 11/2009 | Mair | F16B 39/30 |
| | | | | | 411/305 |
| 2013/0011214 | A1 | * | 1/2013 | Lin | F16B 25/0057 |
| | | | | | 411/387.4 |
| 2017/0045075 | A1 | * | 2/2017 | Hsu | F16B 25/0052 |
| 2021/0277927 | A1 | * | 9/2021 | Chen | F16B 35/044 |

FOREIGN PATENT DOCUMENTS

| CN | 104179770 A | 12/2014 |
| TW | M590199 U | 2/2020 |
| WO | 2007073326 A1 | 6/2007 |

OTHER PUBLICATIONS

Search Report appended to an Office Action, which was issued to Taiwanese counterpart application No. 108131692 by the TIPO dated Jan. 11, 2021 with an English translation thereof.

* cited by examiner

*Primary Examiner* — Roberta S Delisle
(74) *Attorney, Agent, or Firm* — Muncy, Geissler, Olds & Lowe, P.C.

(57) ABSTRACT

A self-tapping screw includes a screw head, a screw shank having a shank body extending from the screw head along an axis, a self-tapping thread extending helically around an outer peripheral surface of the shank body and having a plurality of cutting edges continuously connected to one another and extending outwardly, radially and taperingly from the outer peripheral surface of the shank body, and a supporting unit including a plurality of supporting teeth each disposed between two adjacent ones of the cutting edges, and a plurality of concave surfaces respectively adjacent to the supporting teeth and extending inwardly from the outer peripheral surface of the shank body.

6 Claims, 8 Drawing Sheets

FIG.8

SELF-TAPPING SCREW

FIELD

The disclosure relates to a screw, more particularly to a self-tapping screw.

BACKGROUND

Figure 1:
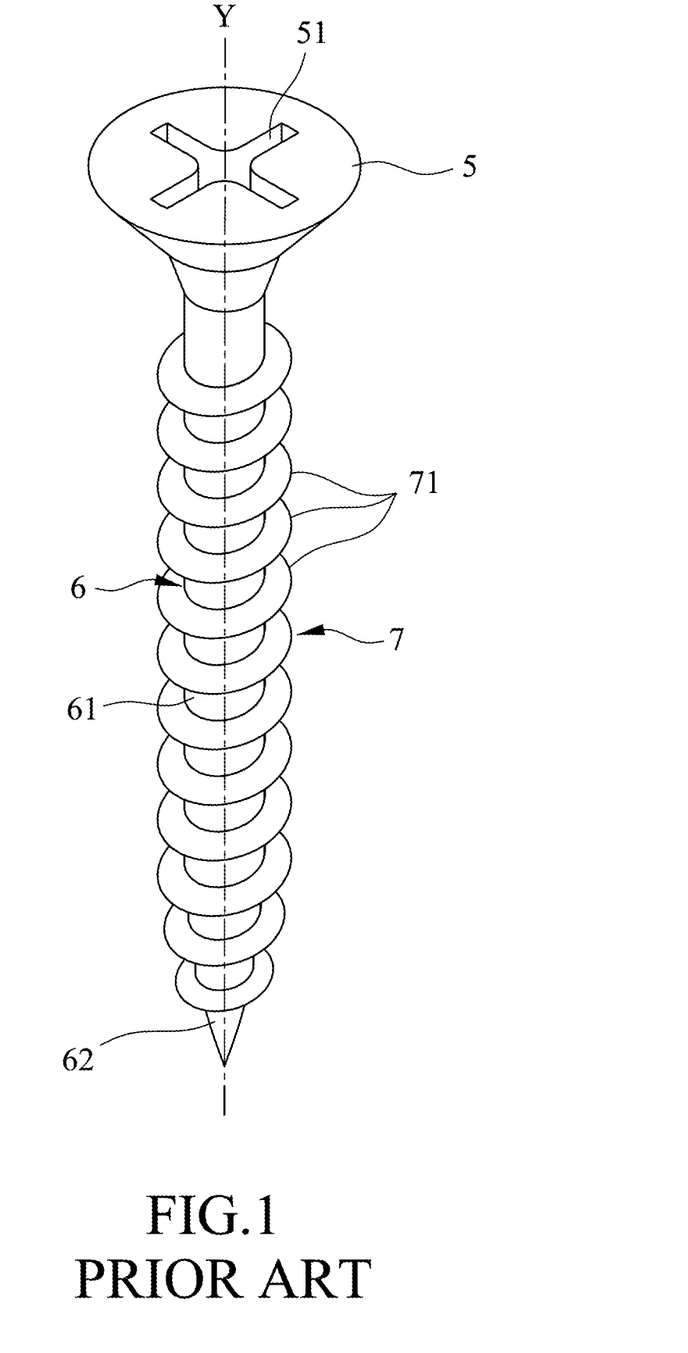
FIG. 1 is a perspective view of a conventional self-tapping screw.

Referring to FIG. 1, a conventional self-tapping screw includes a screw head 5, a screw shank 6, and a self-tapping thread 7. The screw head 5 has a tool groove 51 for a driving tool to engage detachably therewith. The screw shank 6 includes a shank body 61 extending from the screw head 5 along an axis (Y), and a drilling end section 62 extending and tapering from one end of the shank body 61 which is distal to the screw head 5. The self-tapping thread 7 extends helically around an outer peripheral surface of the shank body 61, and has a plurality of cutting edges 71 continuously connected to one another, extending taperingly, outwardly and radially from the outer peripheral surface of the shank body 61.

Figure 2:
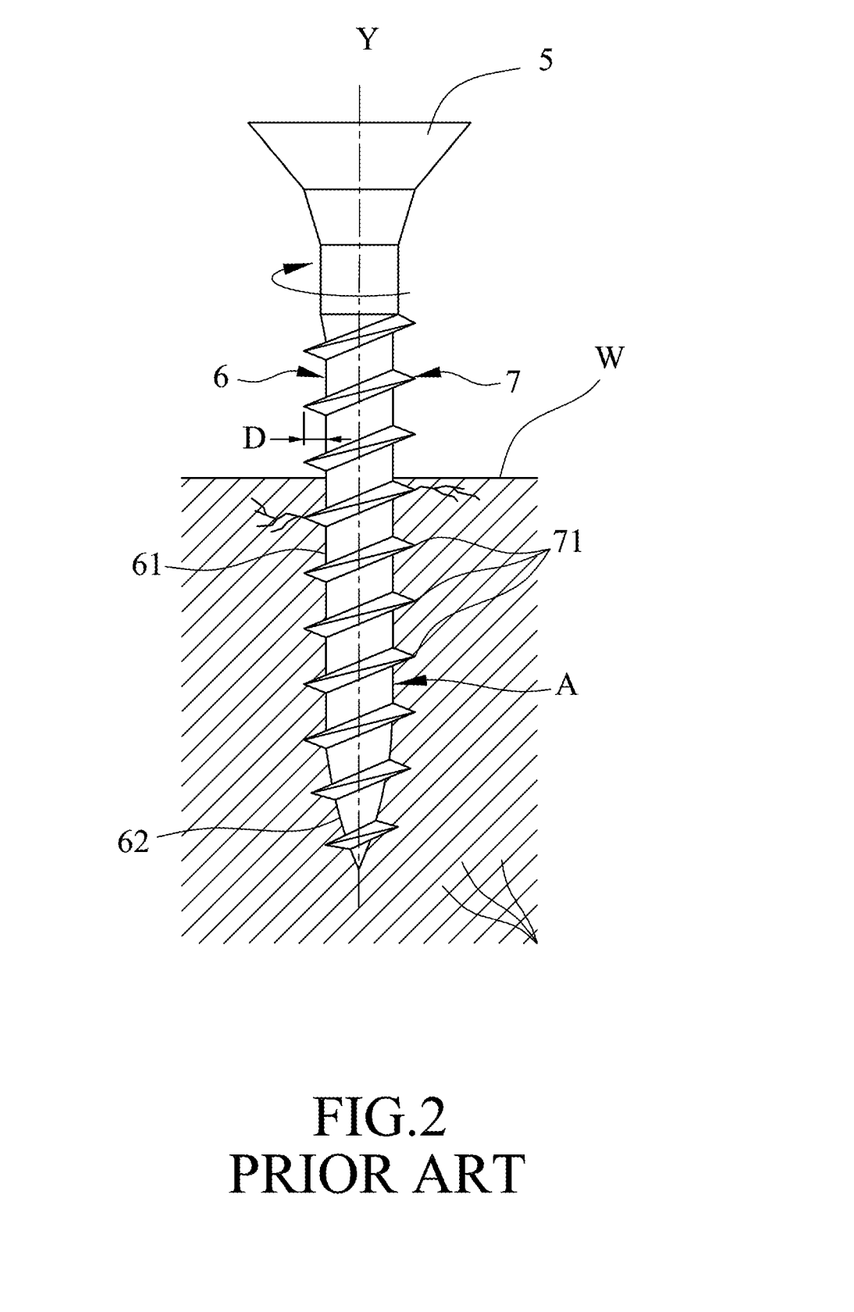
FIG. 2 illustrates how a workpiece is cracked during operation of the conventional self-tapping screw.
Figure 3:
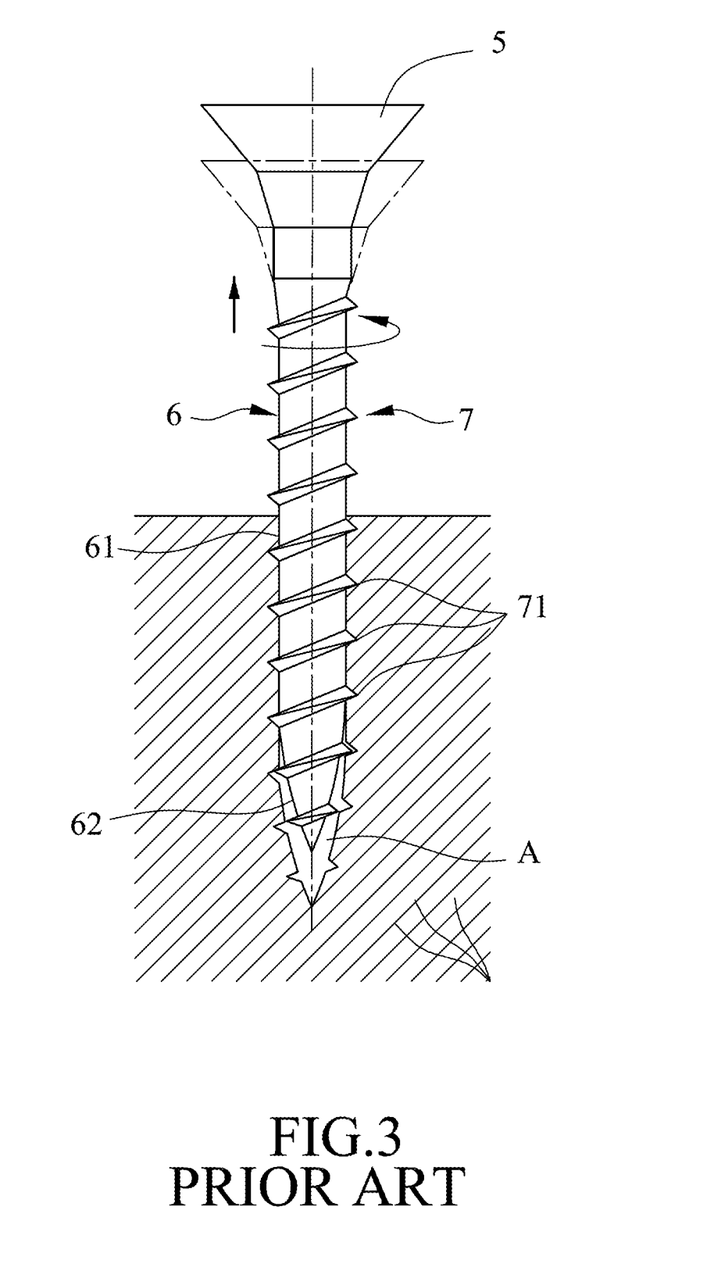
FIG. 3 illustrates how the conventional self-tapping screw has insufficient pulling resistance.

Referring to FIGS. 2 and 3, in use, when the screw head 5 of the conventional self-tapping screw is driven by the driving tool (not shown) to rotate about the axis (Y), the screw shank 6 is driven to rotate therealong with the drilling end section 62 initially boring into a workpiece (W), such as wood, followed by the cutting edges 71 of the screw shank 6 gradually penetrating the workpiece (W) to form a connecting groove (A) corresponding to the self-tapping thread 7.

Although the conventional self-tapping screw can be threadedly connected to the workpiece (W) through the self-tapping thread 7 thereof, in actual practice, since a radial distance (D) between an outer edge of each cutting edge 71 and the outer peripheral surface of the shank body 61 is large, the workpiece (W) is subjected to a severe change in shearing force that renders it to crack during cutting, as shown in FIG. 2, resulting in a decrease in the structural strength of the connecting groove (A) and a decrease in connecting strength. Worse is, if the workpiece (W) is cracked and damaged, a connecting operation may not be possible.

In view of the above problems, if the radial distance (D) between the outer edge of each cutting edge and the outer peripheral surface of the shank body 61 is made smaller to prevent cracking of the workpiece (W), the depth of the connecting groove (A) will be reduced, so that the connecting strength is also decreased. Because the connecting strength between the self-tapping thread 7 and the connecting groove (A) is weak, when the screw head 5 is applied with an axial pulling force, the self-tapping thread 7 is detached directly and axially from the connecting groove (A). The shortcoming of the so-called insufficient pulling resistance in the relevant industry has arisen.

SUMMARY

Therefore, an object of the present disclosure is to provide a self-tapping screw that is capable of alleviating at least one of the drawbacks of the prior art.

According to this disclosure, a self-tapping screw includes a screw head, a screw shank, a self-tapping thread and a supporting unit. The screw head has a tool groove for a driving tool to engage detachably therewith. The screw shank includes a shank body extending from the screw head along an axis, and a drilling end section extending outwardly and taperingly from one end of the shank body which is distal to the screw head. The self-tapping thread extends helically around an outer peripheral surface of the shank body and has a plurality of cutting edges continuously connected to one another and extending outwardly, radially and taperingly from the outer peripheral surface of the shank body. The supporting unit includes a plurality of supporting teeth spaced apart from each other along the axis, and a plurality of concave surfaces respectively adjacent to the supporting teeth and extending inwardly from the outer peripheral surface of the shank body. Each supporting tooth is disposed between two adjacent ones of the cutting edges, and extends radially, outwardly and taperingly from the outer peripheral surface of the shank body. Each concave surface defines a connecting groove.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 4:
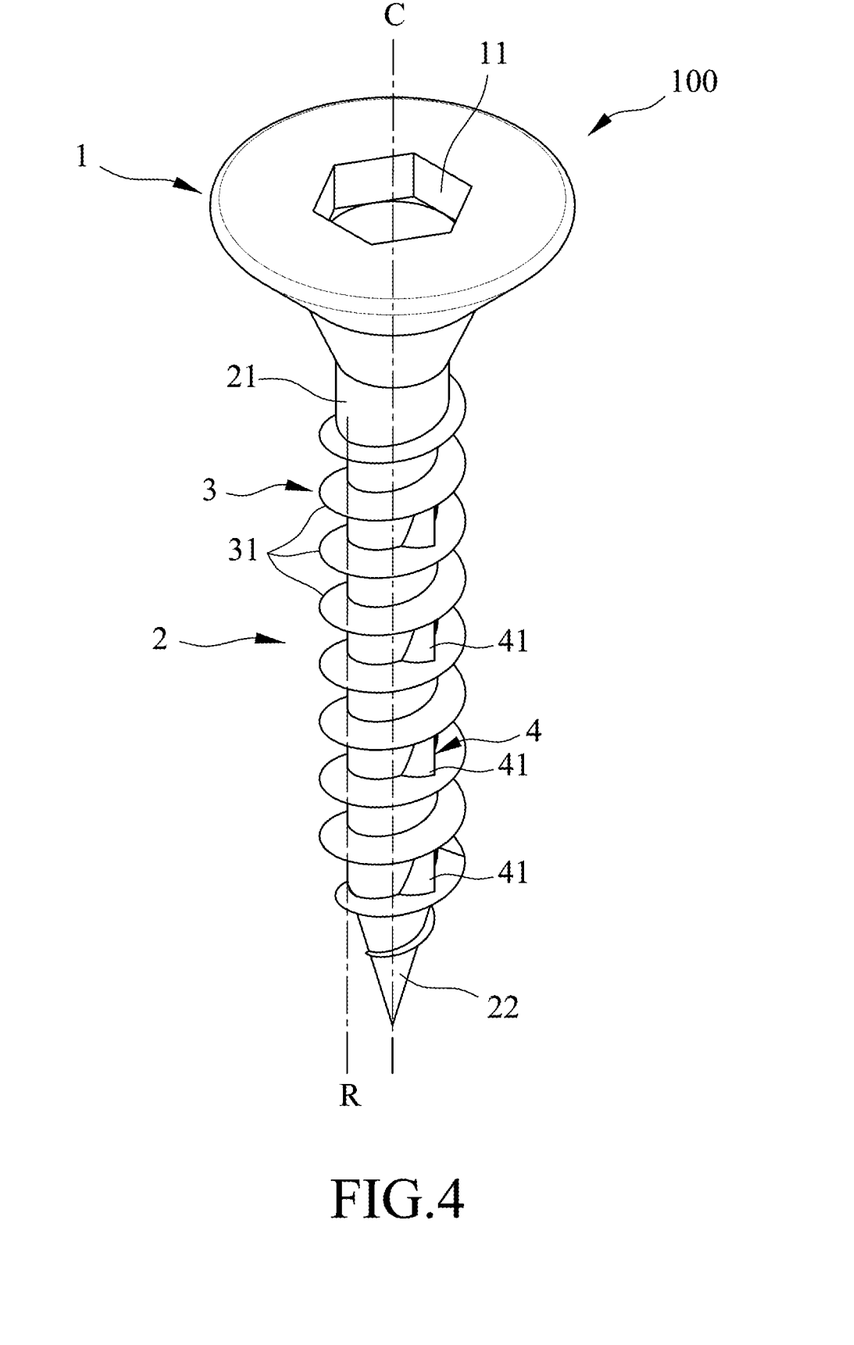
FIG. 4 is a perspective view of a self-tapping screw according to an embodiment of the present disclosure.
Figure 5:
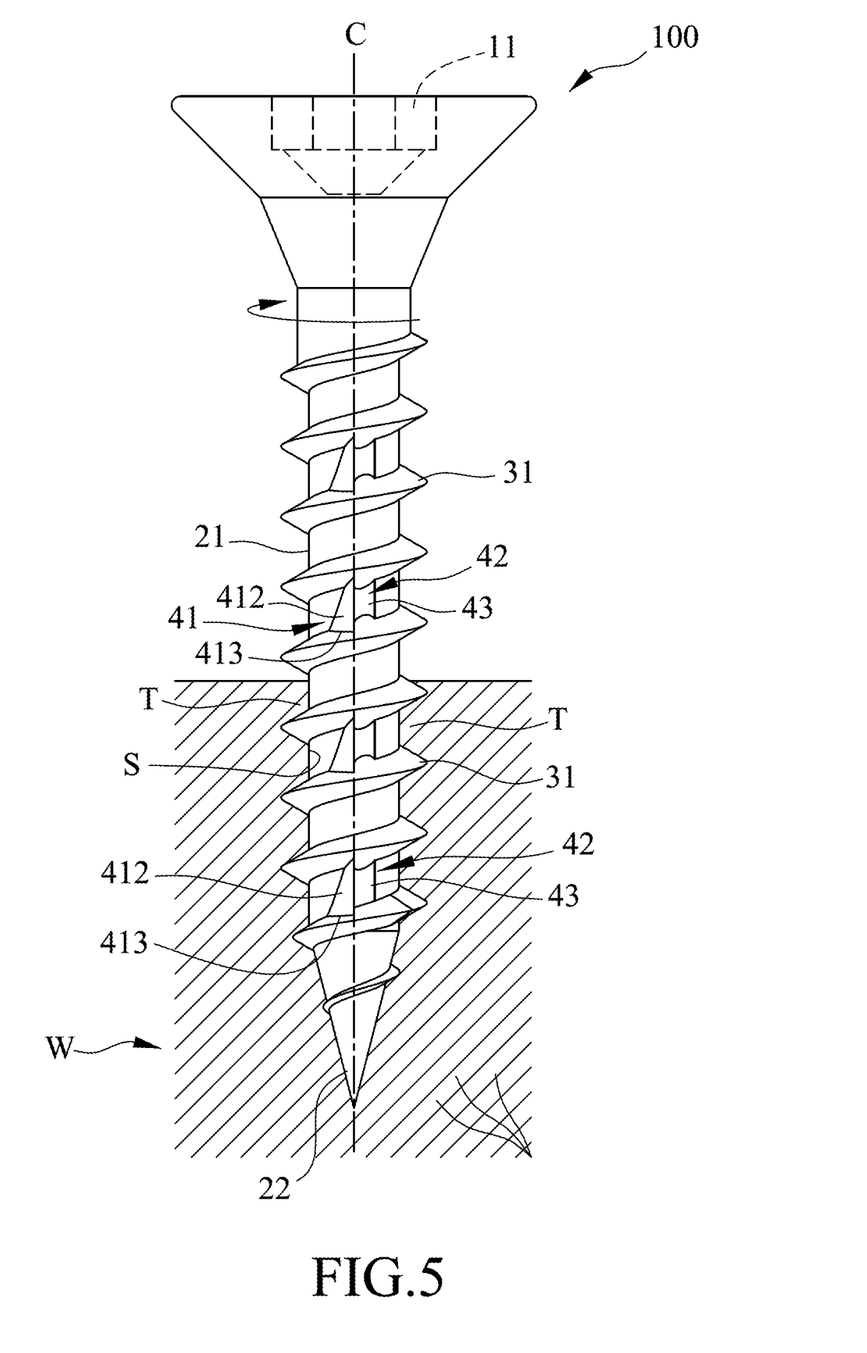
FIG. 5 illustrates the embodiment in a state of use.
Figure 6:
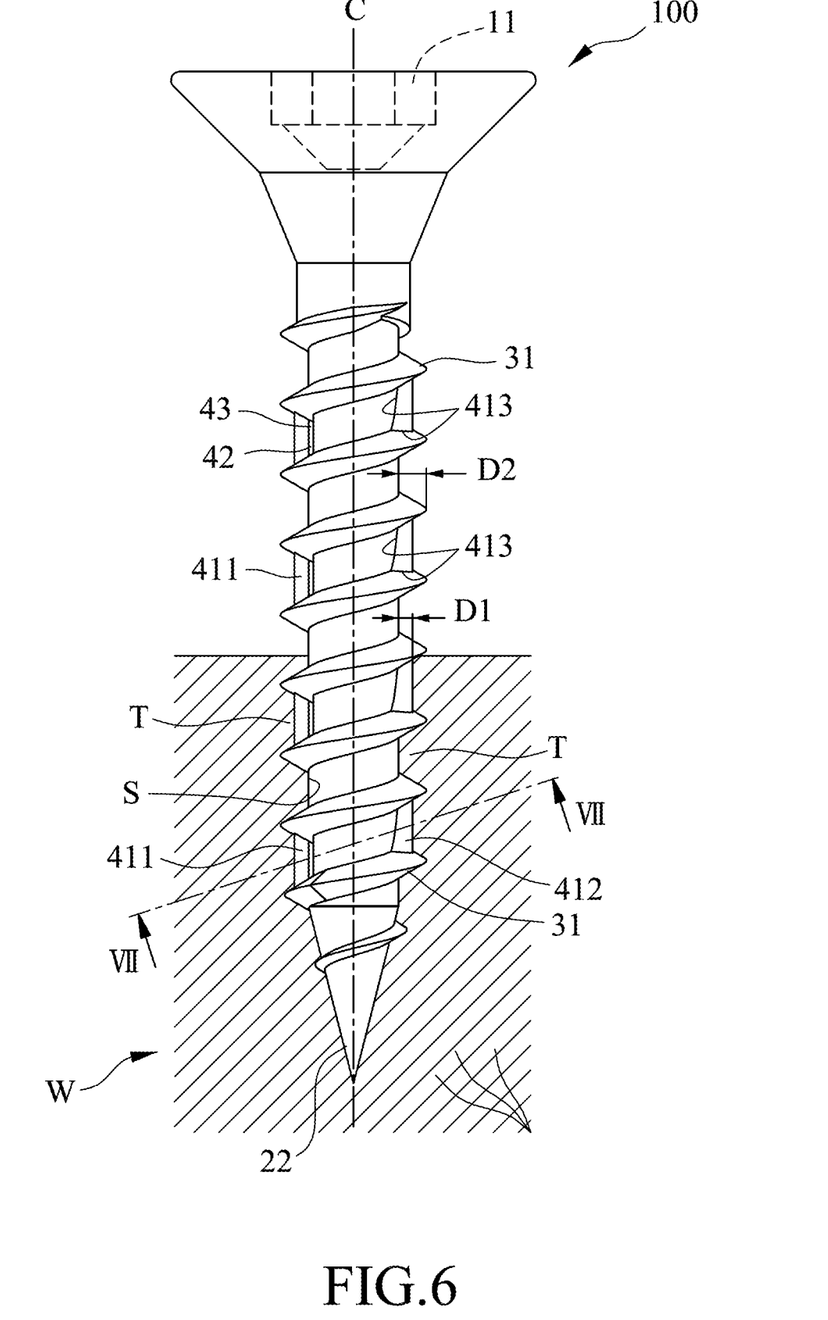
FIG. 6 is a view similar to FIG. 5 but taken from another angle.

Referring to FIGS. 4 to 6, a self-tapping screw 100 according to an embodiment of this disclosure includes a screw head 1, a screw shank 2, a self-tapping thread 3, and a supporting unit 4.

The screw head 1 has a tool groove 11 for a driving tool to engage detachably therewith. Although the tool groove 11 shown in FIG. 4 has a hexagonal shape, it is not limited thereto. The shape of the tool groove 11 may be changed according to the requirement, and may have other shapes, such as a diametral, a cross or an asterisk shape, as long as it can permit a driving tool to engage therewith so as to drive the screw head to rotate.

The screw shank 2 includes a shank body 21 extending from the screw head 1 along an axis (C), and a drilling end section 22 extending outwardly and taperingly from one end of the shank body 21 which is distal to the screw head 1.

The self-tapping thread 3 extends helically around an outer peripheral surface of the shank body 21, and has a plurality of cutting edges 31 continuously connected to one another and extending outwardly, radially and taperingly from the outer peripheral surface of the shank body 21. The self-tapping thread 3 is known in the art.

For convenience of explanation, a reference line (R) is drawn through one side of the screw shank 2 and is parallel to the axis (C), and each cutting edge 31 that will be described below means that it passes through the reference line (R) and surrounds the screw shank 2 by one turn.

Moreover, in order to provide the disposition of the supporting unit 4 which will be described below, each of the cutting edges 31 is axially spaced apart from one another.

Figure 7:
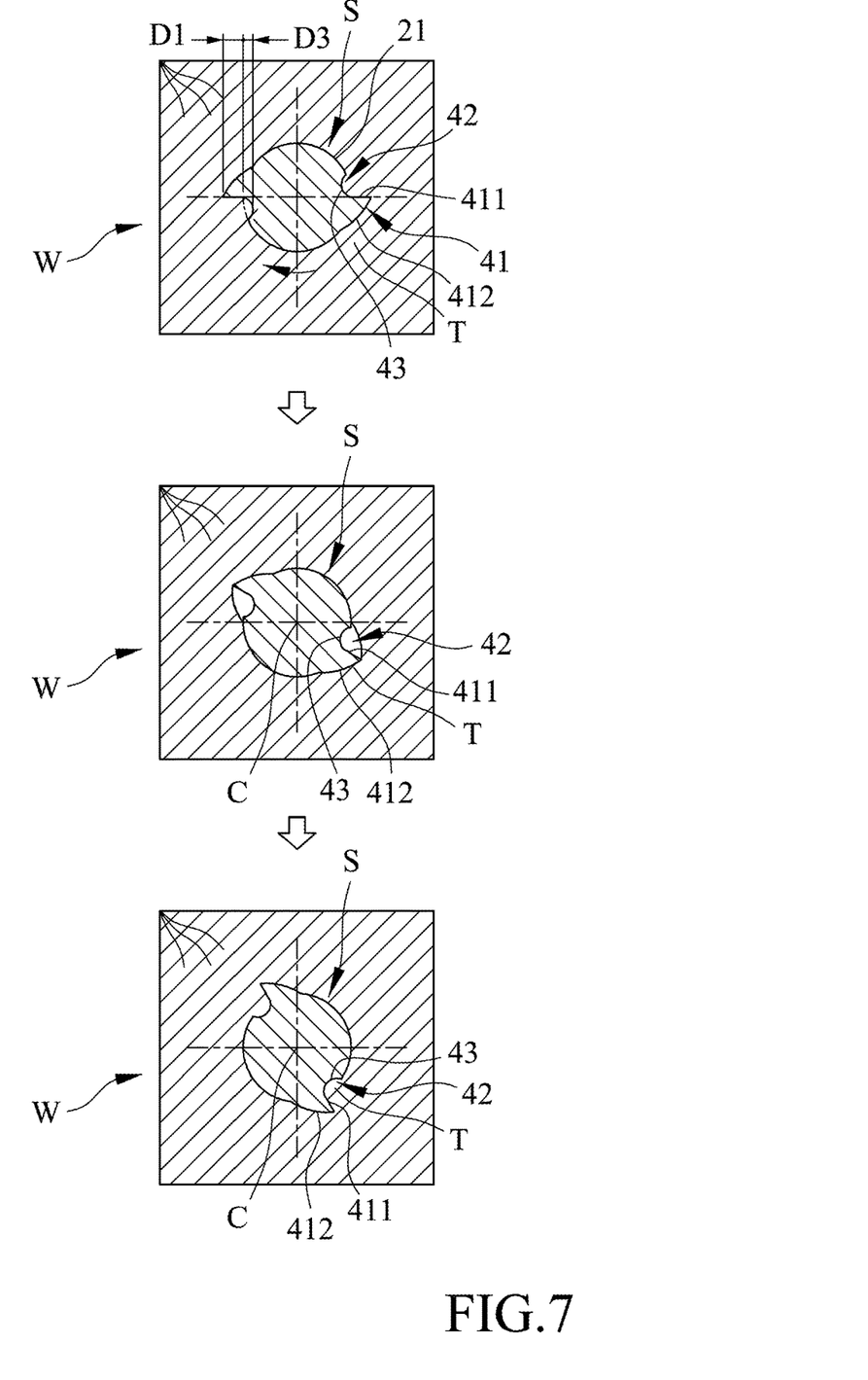
FIG. 7 illustrates consecutive movement of the self-tapping screw of this embodiment when driven into a workpiece.

Referring to FIG. 7, in combination with FIGS. 4 to 6, the supporting unit 4 includes a plurality of supporting teeth 41 spaced apart from each other along the axis (C), and a plurality of concave surfaces 43 respectively adjacent to the supporting teeth 41 and extending inwardly from the outer peripheral surface of the shank body 21. Each supporting tooth 41 is disposed between two adjacent ones of the cutting edges 31, and extends radially, outwardly and taperingly from the outer peripheral surface of the shank body 21. Each concave surface 43 defines a connecting groove 42. Particularly, each supporting tooth 41 has a tetrahedron shape which extends and tapers in a direction from the drilling end section 22 toward the screw head 1, and includes a guiding surface 411 extending radially from an outer edge of a respective one of the supporting teeth 41 toward the axis (C) and connected to a corresponding one of the concave surfaces 43, a push-up surface 412 connected to one end of the guiding surface 411 which is distal to the corresponding concave surface 43, and two connecting surfaces 413 connected integrally and respectively to the shank body 21 and an adjacent cutting edge 31. Precisely speaking, a radial distance (D1) of each supporting tooth 41 measured from the outer edge thereof to the shank body 21 is 50 to 70% of a radial distance (D2) of each cutting edge 31 measured from an outer edge thereof to the shank body 21, and preferably 50%. Further, a radial distance (D3) of the connecting groove 42 of each concave surface 43 measured from an outer edge thereof to the shank body 21 is 30 to 50% of the radial distance (D1) of each supporting tooth 41.

With reference to FIGS. 6 and 7, to drive the self-tapping screw 100 into a workpiece (W), such as wood, a driving tool (not shown) is first engaged with the tool groove 11 and is then rotated in a clockwise direction to drive rotation of the self-tapping thread 3, the supporting unit 4 and the drilling end section 22 of the shank body 21 therealong. The workpiece (W) is first drilled with a small hole by the drilling end section 22, followed by forming a screw groove (S) by the cutting edge 31 at a front end of the shank body 21. A portion of the workpiece (W) that is adjacent to the screw groove (S) and that is not driven by the cutting edge 31 is defined here as a projecting portion (T). The projecting portion (T), as shown in FIGS. 6 and 7, is pushed by an adjacent and similar axial height push-up surface 412 of the supporting tooth 41, so that the workpiece (W) will not be damaged by an intense shearing force generated between the screw groove (S) and the projecting portion (T) due to the difference in the radial distance between the supporting tooth 41 and the shank body 21. The projecting portion (T) is pushed by the adjacent push-up surface 412 of the supporting tooth 41 until the guiding surface 411 passes through the projecting portion (T), and the projecting portion (T) is embedded in and engages the connecting groove 42.

As the cutting edges 31, the supporting teeth 41 and the concave surfaces 43 enter one by one and continuously and spirally cut through the workpiece (W), the screw groove (S) will extend spirally to form a threaded hole, while the projecting portion (T) will not generate a severe change in shearing force during the cutting process because the radial distance between the cutting edge 31 and the supporting tooth 41 is smaller than the radial distance between the cutting edge 31 and the shank body 21, thereby avoiding the crack caused by the change in shearing force, as shown in FIG. 2. Moreover, because the supporting teeth 41 are spacedly disposed, they do not completely cover the shank body 21, so that the diameter of the shank body 21 will not increase due to the thickness of each supporting tooth 41, and the insufficient pulling resistance will not occur.

Figure 8:
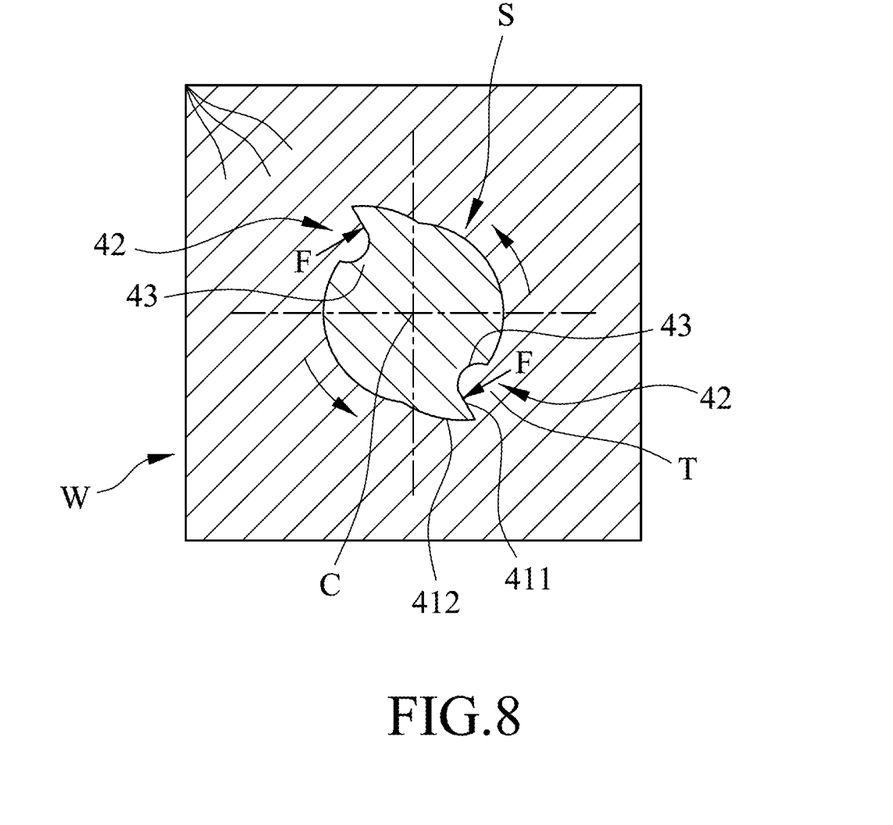
FIG. 8 illustrates how this embodiment can resist pulling.

Referring to FIG. 8, regarding the pulling resistance, according to the state of being pulled by an external force of this embodiment, it can be divided into: an axial rotation that rotates out in a counterclockwise direction about the axis (C); and directly separated from the screw groove (S) along the axis (C). When this embodiment is pulled out by a slower force, this embodiment will tend to rotate out in the counterclockwise direction about the axis (C), but the projecting portion (T) will generate a reverse pushing force (F) on the guiding surface 411 to prevent this embodiment from rotating out of the workpiece (W) in the counterclockwise direction, thereby increasing the pulling resistance of this embodiment.

On the other hand, through the connecting grooves 42 defined by the concave surfaces 43, when this embodiment is pulled out to axially remove from the screw groove (S), the projecting portion (T) embedded in the connecting groove 42 will generate a connecting effect with the connecting groove 42, further strengthening the resistance relative to the concave surface 43 and further enhancing the pulling resistance of this embodiment.

Finally, the above description of clockwise and counterclockwise rotation out of the workpiece (W) of this embodiment is for the reader to easily understand this disclosure, so that the explanation is conducted according to the main streamline of the screw. However, it should be emphasized herein that this embodiment may also be applied to a left-hand threaded screw by transposing the spiral direction of the self-tapping thread 3, oppositely disposing the guiding surface 411 and the push-up surface 412 of each supporting tooth 41, and changing the corresponding positions of the concave surfaces 43, thereby achieving the same effect as this embodiment.

In sum, in the self-tapping screw 100 of this disclosure, during the driving process, through the provision of the supporting teeth 41, the radial distance between each cutting edge 31 and the shank body 21 can be reduced, thereby minimizing cracks caused by severe change in shearing force. Further, the projecting portions (T) of the workpiece (W) can generate pushing forces (F) against the guiding surfaces 411 of the respective supporting teeth 41 to prevent the self-tapping screw 100 from rotating out of the workpiece (W). Moreover, through the engagement of each projecting portion (T) with the respective connecting groove 42, a resistance to axial detachment from the screw groove (S) is formed, thereby enhancing the pulling resistance of this embodiment. Therefore, the object of this disclosure can indeed be achieved.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A self-tapping screw comprising:
   a screw head having a tool groove for a driving tool to engage detachably therewith;
   a screw shank including a shank body extending from said screw head along an axis, and a drilling end section extending outwardly and taperingly from one end of said shank body which is distal to said screw head;

a self-tapping thread extending helically around an outer peripheral surface of said shank body and having a plurality of cutting edges continuously connected to one another and extending outwardly, radially and taperingly from said outer peripheral surface of said shank body; and a supporting unit including a plurality of supporting teeth spaced apart from each other along the axis, and a plurality of concave surfaces respectively adjacent to said supporting teeth and extending inwardly from said outer peripheral surface of said shank body, each of said supporting teeth being disposed between two adjacent ones of said cutting edges, and extending radially, outwardly and taperingly from said outer peripheral surface of said shank body, each of said concave surfaces defining a connecting groove.

2. The self-tapping screw as claimed in claim 1, wherein a radial distance of each of said supporting teeth measured from an outer edge thereof to said shank body is 50 to 70% of a radial distance of each of said cutting edges measured from an outer edge of a respective one of said cutting edges to said shank body.

3. The self-tapping screw as claimed in claim 1, wherein a radial distance of said connecting groove of each of said concave surfaces measured from an outer edge thereof to said shank body is 30 to 50% of said radial distance of each of said supporting teeth.

4. The self-tapping screw as claimed in claim 1, wherein each of said supporting teeth includes a guiding surface connected to a respective one of said concave surfaces, and a push-up surface connected to one end of said guiding surface which is distal to the respective one of said concave surfaces.

5. The self-tapping screw as claimed in claim 4, wherein said guiding surface of each of said supporting teeth extends radially from an outer edge of a respective one of said supporting teeth toward the axis.

6. The self-tapping screw as claimed in claim 1, wherein each of said supporting teeth has a tetrahedron shape which extends and tapers in a direction from said drilling end section toward said screw head.

\* \* \* \* \*